United States Patent
Mori et al.

(10) Patent No.: US 11,117,261 B2
(45) Date of Patent: Sep. 14, 2021

(54) MOTION TRAJECTORY GENERATION APPARATUS

(71) Applicant: TOYOTA JIDOSHA KABUSHIKI KAISHA, Toyota (JP)

(72) Inventors: Yuto Mori, Toyota (JP); Shintaro Yoshizawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 237 days.

(21) Appl. No.: 16/219,105

(22) Filed: Dec. 13, 2018

(65) Prior Publication Data

US 2019/0224847 A1    Jul. 25, 2019

(30) Foreign Application Priority Data

Jan. 23, 2018  (JP) .............................. JP2018-008819

(51) Int. Cl.
*B25J 9/16* (2006.01)
*G06T 7/70* (2017.01)
*G06T 7/73* (2017.01)

(52) U.S. Cl.
CPC ........... *B25J 9/1666* (2013.01); *B25J 9/1697* (2013.01); *G06T 7/70* (2017.01); *G06T 7/73* (2017.01); *G06T 2207/10028* (2013.01)

(58) Field of Classification Search
CPC .................. B25J 9/1666; B25J 9/1697; G06T 2207/10028; G06T 7/70
USPC ........................................................ 700/245
See application file for complete search history.

(56) References Cited

U.S. PATENT DOCUMENTS

| 7,957,583 | B2 * | 6/2011 | Boca ..................... B25J 9/1697 382/154 |
| 8,442,304 | B2 * | 5/2013 | Marrion ............... G06K 9/6211 382/154 |
| 9,844,881 | B2 * | 12/2017 | Payton .................. B25J 9/1697 |
| 10,105,844 | B2 * | 10/2018 | Tan ........................ B25J 9/1633 |
| 2015/0003678 | A1 | 1/2015 | Watanabe et al. |
| 2015/0100194 | A1 | 4/2015 | Terada |
| 2019/0061159 | A1 * | 2/2019 | Domae .................. B25J 9/1676 |

FOREIGN PATENT DOCUMENTS

| JP | 2015-9314 | 1/2015 |
| JP | 5724919 | 5/2015 |

* cited by examiner

*Primary Examiner* — Khoi H Tran
*Assistant Examiner* — Rodney P King
(74) *Attorney, Agent, or Firm* — Oblon, McClelland, Maier & Neustadt, L.L.P.

(57) ABSTRACT

An operation processor of the motion trajectory generation apparatus specifies the target object by extracting first point cloud data that corresponds to the target object from a depth image in the vicinity of the target object acquired by a depth image sensor, excludes the first point cloud data from second point cloud data, which is point cloud data in the vicinity of the target object, in the depth image, estimates, using the second point cloud data after the first point cloud data has been excluded, third point cloud data, which is point cloud data that corresponds to an obstacle that is present in a spatial area from which the first point cloud data is excluded in the depth image, and supplements the estimated third point cloud data in the spatial area from which the first point cloud data is excluded, and generates the plan of the motion trajectory.

5 Claims, 9 Drawing Sheets

MOTION TRAJECTORY GENERATION APPARATUS

CROSS REFERENCE TO RELATED APPLICATIONS

This application is based upon and claims the benefit of priority from Japanese patent application No. 2018-008819, filed on Jan. 23, 2018, the disclosure of which is incorporated herein in its entirety by reference.

BACKGROUND

The present disclosure relates to a motion trajectory generation apparatus of a gripping arm.

A motion trajectory generation apparatus configured to determine, when a plan of a motion trajectory of a gripping arm is generated, an interference between an obstacle which is in the vicinity of a gripping target object and the gripping arm, has been known. Japanese Unexamined Patent Application Publication No. 2015-009314 discloses a motion trajectory generation apparatus configured to exclude an area of a gripping target object that has been specified from a depth image in which a work environment including the gripping target object is measured by a depth image sensor, and perform an interference determination for determining whether the area from which the area of the gripping target object has been excluded interferes with the gripping arm.

SUMMARY

However, in the motion trajectory generation apparatus disclosed in Japanese Unexamined Patent Application Publication No. 2015-009314, even when the obstacle which is in the vicinity of the gripping target object reaches a spatial area which is behind the gripping target object in the area from which the area of the gripping target object is excluded, it is assumed that there is no obstacle in this spatial area. Therefore, when the gripping arm is actually moved based on the plan of the motion trajectory that has been generated, it is possible that at least one of the gripping arm and the gripping target object may hit the obstacle which is behind the gripping target object.

The present disclosure has been made in view of the aforementioned circumstances and aims to provide a motion trajectory generation apparatus capable of further reducing a probability that each of the gripping arm and the gripping target object may interfere with the obstacle in the vicinity of the gripping target object when the gripping arm is operated in accordance with the generated motion trajectory.

The present disclosure is a motion trajectory generation apparatus of a gripping arm, the motion trajectory generation apparatus including: a gripping arm configured to grip a target object; a depth image sensor configured to acquire a depth image including point cloudpoint cloud data, which is coordinate data of a plurality of points on a surface of a subject; and an operation processor configured to perform operation processing for generating a plan of a motion trajectory of the gripping arm, in which the operation processor specifies the target object by extracting first point cloudpoint cloud data that corresponds to the target object from a depth image in the vicinity of the target object acquired by the depth image sensor, excludes the first point cloudpoint cloud data from second point cloudpoint cloud data, which is point cloudpoint cloud data in the vicinity of the target object, in the depth image, estimates, using at least one of the first point cloudpoint cloud data and the second point cloudpoint cloud data after the first point cloudpoint cloud data has been excluded, third point cloudpoint cloud data, which is point cloudpoint cloud data that corresponds to an obstacle that is present in a spatial area from which the first point cloudpoint cloud data is excluded in the depth image, and supplements the third point cloudpoint cloud data in the spatial area from which the first point cloudpoint cloud data is excluded, and generates the plan of the motion trajectory in such a way that neither the gripping arm nor the target object interferes with the second point cloudpoint cloud data after the first point cloudpoint cloud data has been excluded and the third point cloudpoint cloud data.

In the depth image, the third point cloudpoint cloud data, which is the point cloudpoint cloud data that corresponds to the obstacle that is present in the spatial area from which the first point cloudpoint cloud data is excluded, is estimated using the second point cloudpoint cloud data after the first point cloudpoint cloud data that corresponds to the gripping target object is excluded, and the estimated third point cloudpoint cloud data is supplemented in the spatial area. According to this processing, when there is an obstacle in the spatial area from which the first point cloudpoint cloud data is excluded in the generation of the plan of the motion trajectory, the presence of this obstacle is taken into account. Accordingly, when the gripping arm is actually operated in accordance with the plan of the motion trajectory that has been generated, it is possible to reduce the probability that each of the gripping arm and the gripping target object may interfere with the obstacle.

Further, the operation processor specifies planes that are present in the vicinity of the target object from the second point cloudpoint cloud data after the first point cloudpoint cloud data has been excluded, extends the planes that are present in the vicinity of the target object to the spatial area from which the first point cloudpoint cloud data is excluded, and estimates point cloudpoint cloud data that corresponds to a part in the spatial area from which the first point cloudpoint cloud data is excluded among the planes that have been extended to be the third point cloudpoint cloud data.

The planes that are present in the vicinity of the target object can be specified easily from the second point cloudpoint cloud data after the first point cloudpoint cloud data is excluded. When the planes that have been specified are extended to the spatial area from which the first point cloudpoint cloud data is excluded, the point cloudpoint cloud data that corresponds to the part in the spatial area from which the first point cloudpoint cloud data is excluded among the planes that have been extended can be easily calculated. That is, by estimating the point cloudpoint cloud data that corresponds to the part in the spatial area from which the first point cloudpoint cloud data is excluded among the planes that have been extended to be the third point cloudpoint cloud data, it is possible to supplement the obstacle that is present in the spatial area from which the first point cloudpoint cloud data is excluded without performing complicated calculations.

Further, the operation processor determines whether it is possible to specify an obstacle that is extended in a direction having some angle with respect to a horizontal direction from the second point cloudpoint cloud data in the depth image, and when it is impossible to specify the obstacle that is extended in the direction having the angle, the operation processor excludes the first point cloudpoint cloud data from the second point cloudpoint cloud data in the depth image and does not perform processing for supplementing the estimated third point cloudpoint cloud data in the spatial area from which the first point cloudpoint cloud data is excluded.

According to the above processing, it is possible to eliminate the calculation time required for unnecessary processing, whereby it is possible to perform operation processing for generating the trajectory through which the gripping arm is operated more smoothly.

The present disclosure is a motion trajectory generation method in which a plan of a motion trajectory of a gripping arm for gripping a target object is generated using a depth image sensor configured to acquire a depth image including point cloudpoint cloud data, which is coordinate data of a plurality of points on a surface of a subject, the method including the steps of: specifying first point cloudpoint cloud data that corresponds to the target object from a depth image in the vicinity of the target object acquired by the depth image sensor; excluding the first point cloudpoint cloud data from second point cloudpoint cloud data, which is point cloudpoint cloud data in the vicinity of the target object, in the depth image; estimating, using at least one of the first point cloudpoint cloud data and the second point cloudpoint cloud data after the first point cloudpoint cloud data has been excluded, third point cloudpoint cloud data, which is point cloudpoint cloud data that corresponds to an obstacle that is present in a spatial area from which the first point cloudpoint cloud data is excluded in the depth image, and supplementing the estimated third point cloudpoint cloud data in the spatial area from which the first point cloudpoint cloud data is excluded; and generating the plan of the motion trajectory in such a way that neither the gripping arm nor the target object interferes with the second point cloudpoint cloud data and the third point cloudpoint cloud data. Accordingly, it is possible to further reduce the probability that each of the gripping arm and the gripping target object may interfere with the obstacle in the vicinity of the gripping target object when the plan of the motion trajectory is generated.

The present disclosure is a program for causing a computer to execute a processing procedure for generating a plan of a motion trajectory of a gripping arm for gripping a target object using a depth image sensor configured to acquire a depth image including point cloudpoint cloud data, which is coordinate data of a plurality of points on a surface of a subject, the processing procedure including: specifying first point cloudpoint cloud data that corresponds to the target object from a depth image in the vicinity of the target object acquired by the depth image sensor; excluding the first point cloudpoint cloud data from second point cloudpoint cloud data, which is point cloudpoint cloud data in the vicinity of the target object, in the depth image; estimating, using at least one of the first point cloudpoint cloud data and the second point cloudpoint cloud data after the first point cloudpoint cloud data has been excluded, third point cloudpoint cloud data, which is point cloudpoint cloud data that corresponds to an obstacle that is present in a spatial area from which the first point cloudpoint cloud data is excluded in the depth image, and supplementing the estimated third point cloudpoint cloud data in the spatial area from which the first point cloudpoint cloud data is excluded; and generating the plan of the motion trajectory in such a way that neither the gripping arm nor the target object interferes with the second point cloudpoint cloud data and the third point cloudpoint cloud data. Accordingly, it is possible to further reduce the probability that each of the gripping arm and the gripping target object may interfere with the obstacle in the vicinity of the gripping target object when the plan of the motion trajectory is generated.

According to the present disclosure, it is possible to further reduce the probability that each of the gripping arm and the gripping target object may interfere with the obstacle in the vicinity of the gripping target object when the gripping arm is operated in accordance with the generated motion trajectory.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, the present disclosure will be described based on the following embodiments. However, the following embodiments are not intended to limit the disclosure. Moreover, it is not absolutely necessary to provide all the configurations to be described in the following embodiments.

Figure 1:
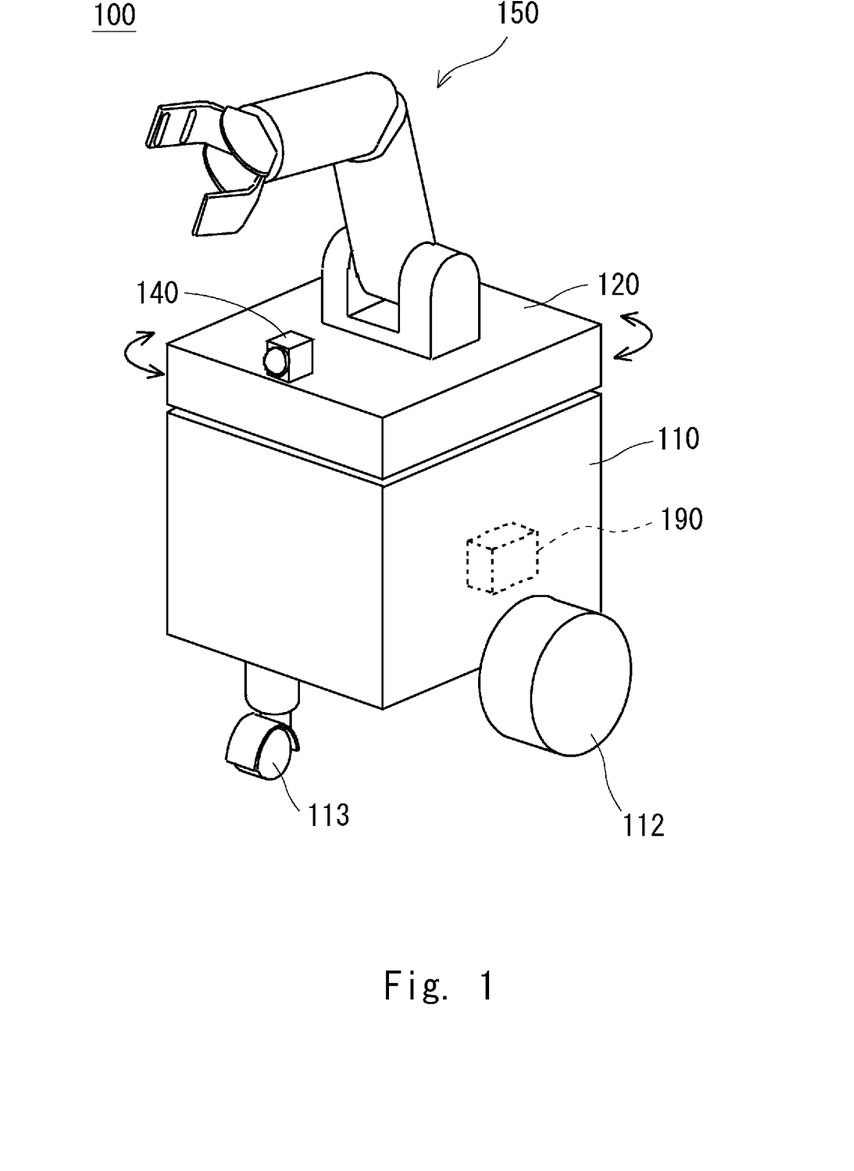
FIG. 1 is an external perspective view of a moving robot as a motion trajectory generation apparatus according to an embodiment.

FIG. 1 is an external perspective view of a moving robot 100 as a motion trajectory generation apparatus according to this embodiment. As shown in FIG. 1, the moving robot 100 includes a gripping arm 150, a depth image sensor 140, and a control unit 190. The moving robot 100 further includes a cart base 110 to which a movement mechanism is attached and an upper body base 120 to which the depth image sensor 140 is attached.

The gripping arm 150 is mainly formed of a plurality of arms and hands. One end of the arm is supported by the upper body base 120. The other end of the arm supports the hand. When the gripping arm 150 is driven by an actuator (not shown), the gripping arm 150 executes a gripping operation such as an operation of gripping a conveyance object in accordance with a given task.

The depth image sensor 140 is arranged in the front of the upper body base 120. The depth image sensor 140 acquires a depth image including point cloudpoint cloud data, which is coordinate data of a plurality of points on a surface of a subject. Specifically, the depth image sensor 140 includes an irradiation unit that irradiates a target space with a pattern light. The depth image sensor 140 receives a reflection light of the pattern light by an image-pickup device and acquires coordinate data of points on the surface of the subject captured by each pixel from distortion or the size of the pattern in the image. Any sensor that is able to capture an image of the target space and acquire the distance to the subject for each pixel may be employed as the depth image sensor 140.

The cart base 110 includes two driving wheels 112 and one caster 113 as a movement mechanism. The two driving wheels 112 are disposed on the respective side parts of the cart base 110 opposed to each other in such a way that the rotational axes thereof match each other. The driving wheels 112 are rotationally driven independently from each other by a motor (not shown). The caster 113, which is a trailing wheel, is disposed so that a turning axis extending in the vertical direction from the cart base 110 supports the wheels so that there is some space between it and the rotation axes of the wheels, and tracks in accordance with a moving direction of the cart base 110. The moving robot 100 travels straight ahead when, for example, the two driving wheels 112 are rotated at the same rotational speed in the same direction and turns around the vertical axis that passes the center of gravity when the two driving wheels 112 are rotated at the same rotational speed in the opposite directions.

The cart base 110 is provided with a control unit 190. The control unit 190 includes an operation processor, a memory and the like that will be explained later.

The upper body base 120 is supported by the cart base 110 in such a way that the upper body base 120 can be rotated about the vertical axis with respect to the cart base 110. The upper body base 120 is turned by a motor (not shown) and can be oriented in a predetermined direction with respect to the travelling direction of the cart base 110.

The operation processor included in the control unit 190 performs operation processing for generating a trajectory through which the gripping arm 150 is operated. The details of the operation processing for generating the trajectory through which the gripping arm 150 is operated will be explained later.

Figure 2:
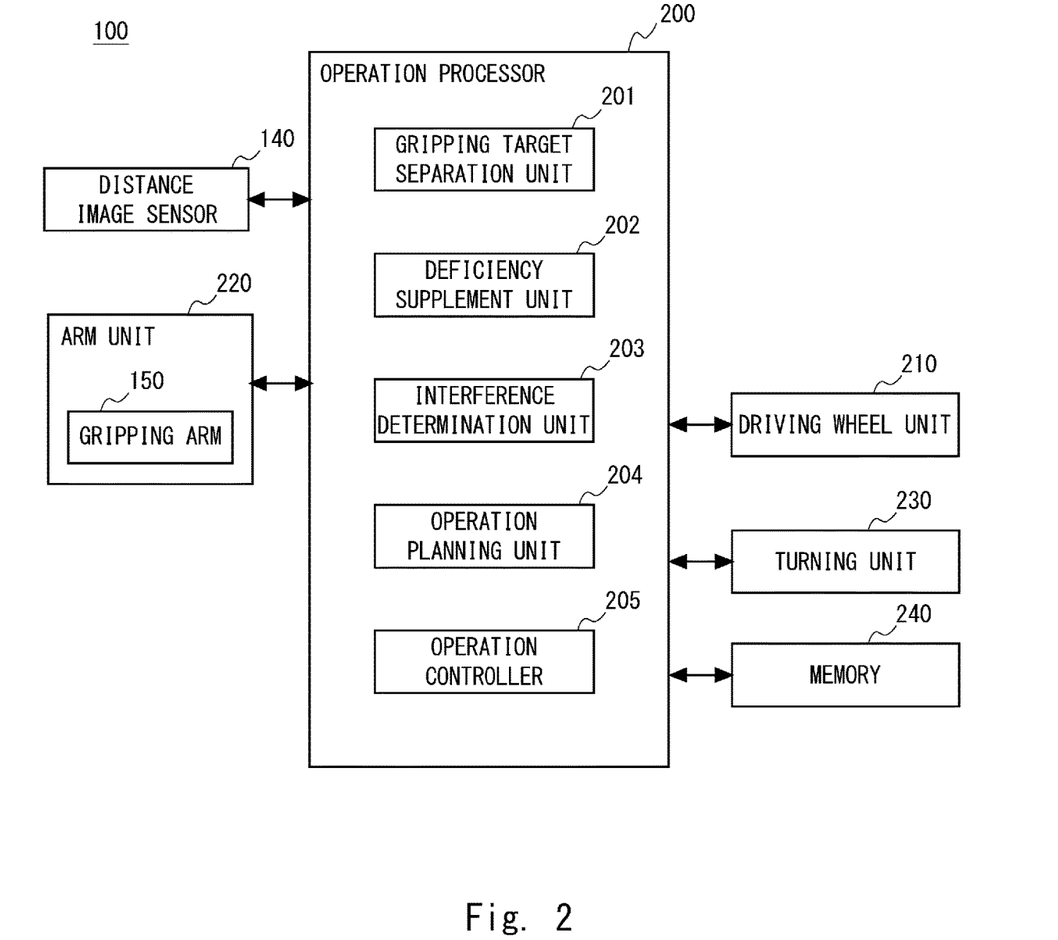
FIG. 2 is a control block diagram of the moving robot as the motion trajectory generation apparatus according to this embodiment.

FIG. 2 is a control block diagram of the moving robot 100. An operation processor 200 included in the control unit 190 (see FIG. 1) is, for example, a CPU, and includes a gripping target separation unit 201, a deficiency supplement unit 202, an interference determination unit 203, an operation planning unit 204, and an operation controller 205.

The gripping target separation unit 201 separates an area of a gripping target object from the area other than this area in the depth image and extracts the area other than the gripping target object. The deficiency supplement unit 202 supplements a spatial area from which first point cloudpoint cloud data that corresponds to the gripping target object is excluded in the depth image.

The interference determination unit 203 determines whether each of the gripping arm 150 and the gripping target object interferes with a surrounding obstacle when the gripping arm 150 included in an arm unit 220 is operated in accordance with the plan of the motion trajectory that has been generated. The operation planning unit 204 generates the plan of the motion trajectory from a timing when the gripping arm 150 grips the gripping target object to a timing when the gripping arm 150 takes out the gripping target object. The operation controller 205 controls the actuator that drives the gripping arm 150 so that the gripping arm 150 operates in accordance with the plan of the motion trajectory.

The arm unit 220 includes, besides the gripping arm 150, a drive circuit and an actuator for driving the gripping arm 150, an encoder for detecting the operation amount of the actuator and the like. The operation controller 205 of the operation processor 200 operates the actuator by sending a drive signal to the arm unit 220, and executes posture control and grip control of the gripping arm 150. Further, the operation controller 205 calculates the operating speed, the operating distance, the posture and the like of the gripping arm 150 by receiving a detection signal of the encoder.

The operation processor 200 may further execute various calculations related to control of the moving robot 100 by transmitting or receiving information such as a command or sampling data to or from a driving wheel unit 210, a turning unit 230, a memory 240, the depth image sensor 140 and the like.

The driving wheel unit 210 is provided in the cart base 110, includes a drive circuit and a motor for driving the driving wheels 112, an encoder for detecting the rotation amount of the motor and the like, and functions as a movement mechanism for autonomous movement. The turning unit 230, which is provided so as to straddle the cart base 110 and the upper body base 120, includes a drive circuit and a motor for turning the upper body base 120, an encoder for detecting the rotation amount of the motor and the like. The memory 240 is a non-volatile storage medium. The memory 240 stores a control program for controlling the moving robot 100, various parameter values, functions, look-up tables and the like used for control.

The operation controller 205 of the operation processor 200 may execute rotation control of the motor in the driving wheel unit 210 by sending a drive signal to the driving wheel unit 210. Further, the operation controller 205 may calculate the moving speed, the moving distance, the turning angle and the like of the moving robot 100 by receiving the detection signal of the encoder. The operation controller 205 calculates the moving speed, the moving distance, the turning angle and the like of the moving robot 100 and then sends a drive signal to the turning unit 230, whereby the operation controller 205 is able to operate the motor in the turning unit 230 and to cause, for example, the depth image sensor 140 to be oriented in a specific direction.

Next, operation processing for generating the trajectory through which the gripping arm 150 is operated will be explained in detail.

Figure 3:
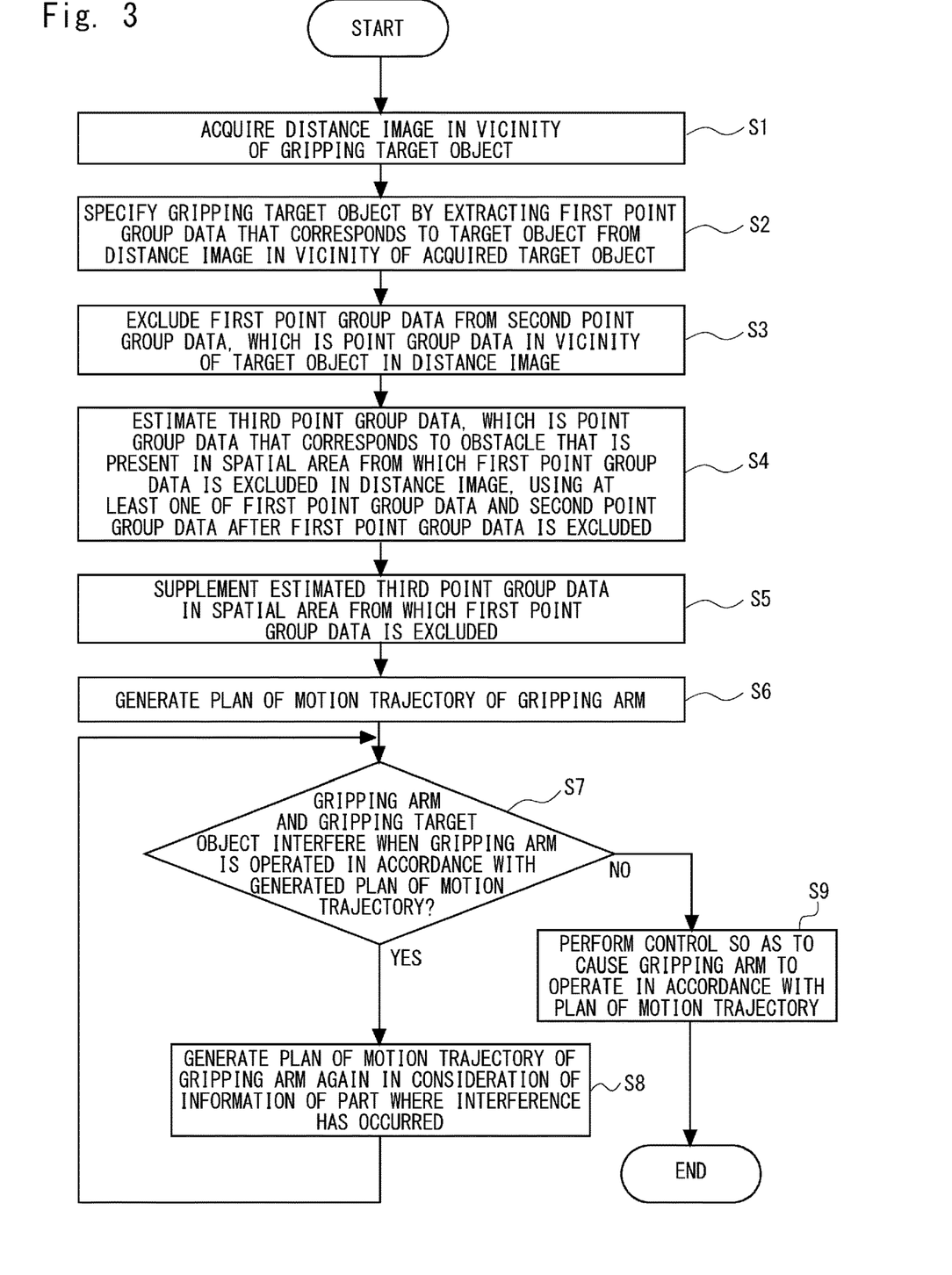
FIG. 3 is a flowchart showing a flow of operation processing for generating a trajectory through which a gripping arm is operated in the moving robot as the motion trajectory generation apparatus according to this embodiment.

FIG. 3 is a flowchart showing a flow of the operation processing for generating the trajectory through which the gripping arm 150 is operated. As shown in FIG. 3, first, the depth image sensor 140 acquires a depth image in the vicinity of the gripping target object (Step S1). That is, when the depth image sensor 140 receives a control signal from the operation processor 200, the depth image sensor 140 acquires the depth image in the vicinity of the gripping target object and sends this depth image back to the operation processor 200.

Next, the gripping target separation unit 201 of the operation processor 200 specifies the gripping target object by extracting the first point cloudpoint cloud data that corresponds to the target object from the depth image in the vicinity of the target object acquired by the depth image sensor 140 (Step S2).

Further, the gripping target separation unit 201 excludes the first point cloudpoint cloud data from second point cloudpoint cloud data, which is point cloudpoint cloud data in the vicinity of the target object in the depth image (Step S3). That is, the area of the gripping target object and the area other than the gripping target object in the depth image data are separated from each other, and the depth image data from which the area of the gripping target object is excluded is generated.

Next, the deficiency supplement unit 202 of the operation processor 200 estimates third point cloudpoint cloud data, which is point cloudpoint cloud data that corresponds to the obstacle that is present in a spatial area from which the first point cloudpoint cloud data is excluded in the depth image, using the second point cloudpoint cloud data after the first point cloudpoint cloud data is excluded (Step S4). That is, the deficiency supplement unit 202 estimates the shape of the obstacle that is present in the spatial area from which the gripping target object is excluded based on at least one of the shape of the gripping target object and the shape of the obstacle in the area other than the gripping target object in the depth image data.

Further, the deficiency supplement unit 202 supplements the estimated third point cloudpoint cloud data in the spatial area from which the first point cloudpoint cloud data is excluded (Step S5). That is, the deficiency supplement unit 202 supplements this spatial area in such a way that this estimated obstacle is present in this spatial area in the depth image.

In the processing following Step S5 (Steps S6-S9), the motion trajectory of the gripping arm 150 is generated so as to prevent each of the gripping arm 150 and the gripping target object from interfering with the second point cloudpoint cloud data after the first point cloudpoint cloud data is excluded and the third point cloudpoint cloud data.

First, the operation planning unit 204 generates a plan of the motion trajectory of the gripping arm 150 and outputs the plan of the motion trajectory that has been generated to the interference determination unit 203 (Step S6). A known method such as the one disclosed in Japanese Patent No. 5724919 may be used for the method of generating the plan of the motion trajectory. Further, the interference determination unit 203 determines, when the gripping arm 150 is operated in accordance with the generated plan of the motion trajectory using the depth image that has been supplemented, whether at least one of the gripping arm 150 and the gripping target object interferes with the second point cloudpoint cloud data after the first point cloudpoint cloud data is excluded and the third point cloudpoint cloud data (Step S7).

When it is determined in Step S7 that interference has occurred (YES), the operation planning unit 204 generates a plan of the motion trajectory of the gripping arm 150 again in consideration of information on the part where the interference has occurred and outputs the plan of the motion trajectory that has been generated to the interference determination unit 203 (Step S8). After Step S8, the process returns to Step S7 again.

When it is determined in Step S7 that interference has not occurred (NO), the operation controller 205 performs control so as to cause the gripping arm 150 to operate in accordance with the plan of the motion trajectory that has been generated (Step S9). That is, the operation controller 205 sends a control signal to the actuator of the gripping arm 150 so as to cause the gripping arm 150 to operate in accordance with the plan of the motion trajectory that has been generated.

Next, a method of estimating the third point cloudpoint cloud data, which is point cloudpoint cloud data that corresponds to the obstacle that is present in the spatial area from which the first point cloudpoint cloud data that corresponds to the gripping target object is excluded, in Step S5 of FIG. 3 will be explained.

Figure 4:
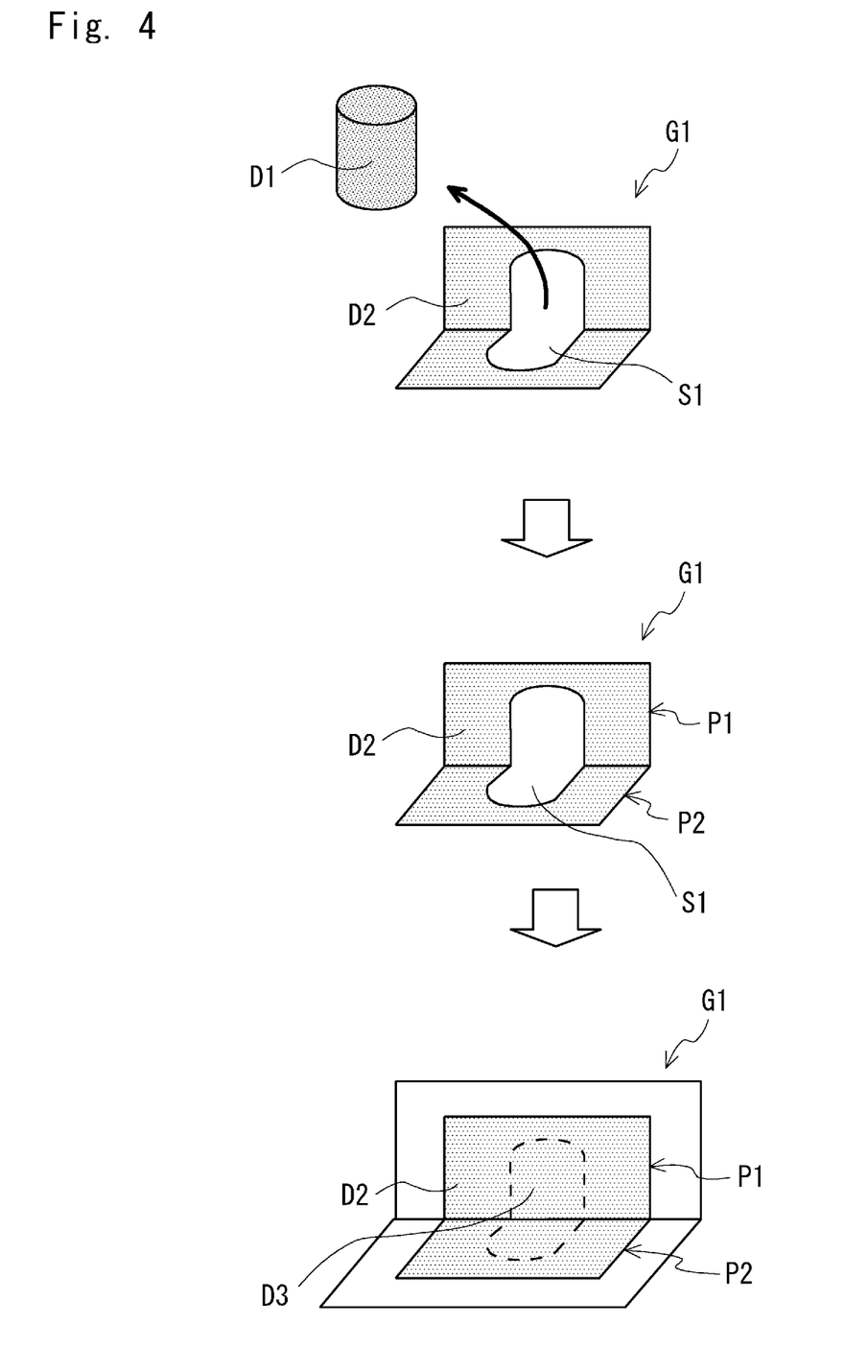
FIG. 4 is a schematic view for explaining a method of estimating third point cloudpoint cloud data, which is point cloudpoint cloud data that corresponds to an obstacle that is present in a spatial area from which first point cloudpoint cloud data is excluded in the operation processing for generating the trajectory through which the gripping arm is operated.

FIG. 4 is a schematic view for explaining a method of estimating third point cloudpoint cloud data D3, which is point cloudpoint cloud data that corresponds to the obstacle that is present in a spatial area S1 from which first point cloudpoint cloud data D1 that corresponds to the gripping target object is excluded. First, as shown in the upper stage of FIG. 4, the gripping target separation unit 201 (see FIG. 2) excludes the first point cloudpoint cloud data D1 from the second point cloudpoint cloud data in the vicinity of the gripping target object in a depth image G1. Next, as shown in the middle stage in FIG. 4, the deficiency supplement unit 202 (see FIG. 2) specifies planes P1 and P2 that are present in the vicinity of the target object from a second point cloudpoint cloud data D2 after the first point cloudpoint cloud data D1 is excluded. Next, the deficiency supplement unit 202 (see FIG. 2) extends the planes P1 and P2 that are present in the vicinity of the target object to the spatial area S1 from which the first point cloudpoint cloud data D1 is excluded, and estimates the point cloudpoint cloud data that corresponds to the part in the spatial area from which the first point cloudpoint cloud data is excluded among the planes that have been extended to be the third point cloudpoint cloud data D3. Then the deficiency supplement unit 202 (see FIG. 2) supplements the estimated third point cloudpoint cloud data D3 in the spatial area S1 from which the first point cloudpoint cloud data has been excluded (see the lower stage of FIG. 4). According to the above processing, it is possible to supplement the obstacle that is present in the spatial area S1 from which the first point cloudpoint cloud data D1 is excluded without performing complicated calculations.

Next, effects of the method of generating the trajectory through which the gripping arm 150 is operated in the moving robot 100 as the motion trajectory generation apparatus according to this embodiment will be explained.

Figure 5:
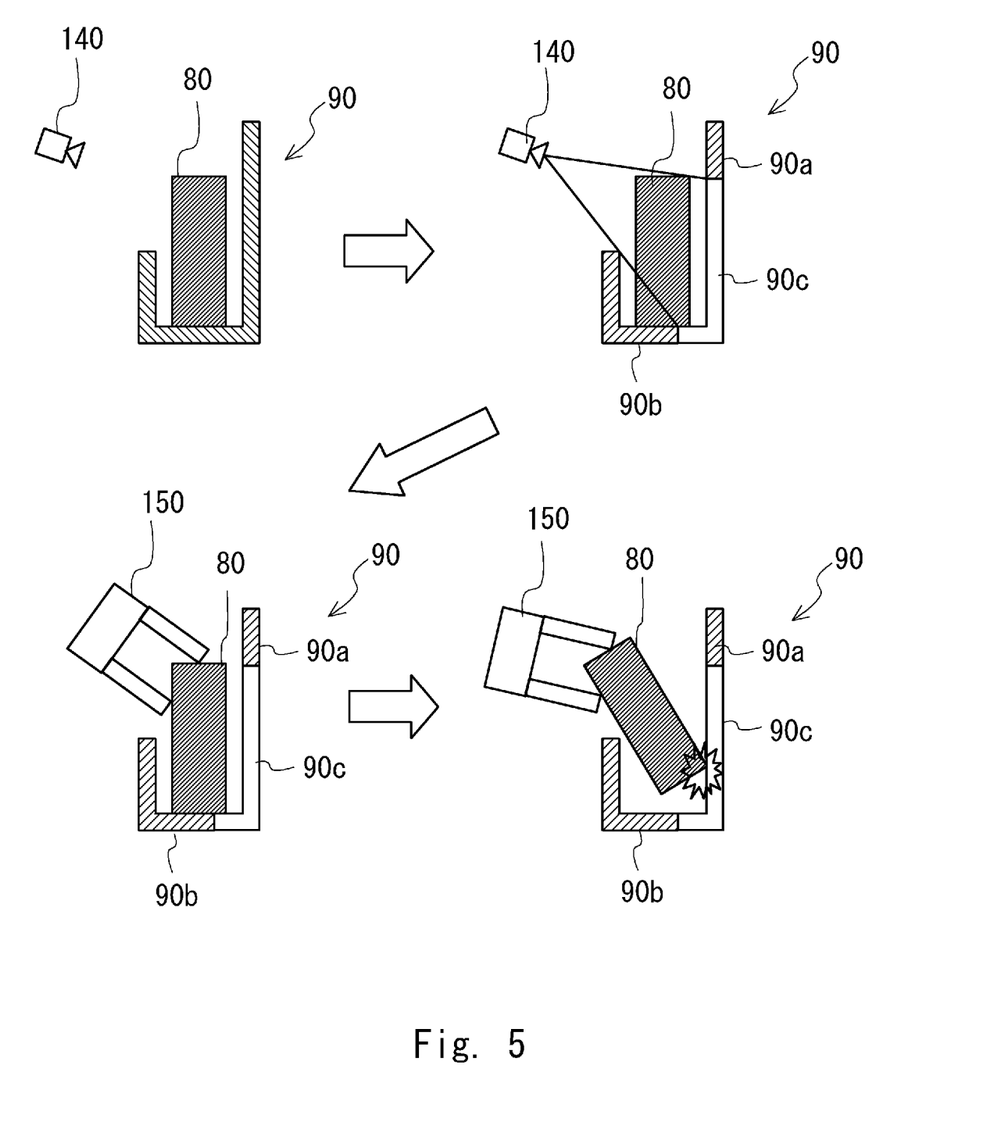
FIG. 5 is a schematic view for explaining a problem of a method of generating a trajectory through which a gripping arm is operated in a motion trajectory generation apparatus according to a comparative example.

With reference first to FIG. 5, a problem that may occur in the method of generating the trajectory through which the gripping arm 150 is operated in the motion trajectory generation apparatus according to a comparative example will be explained. FIG. 5 is a schematic view for explaining the problem in the method of generating the trajectory through which the gripping arm 150 is operated in the motion trajectory generation apparatus according to the comparative example.

As shown in the upper left side of FIG. 5, first, the depth image in the vicinity of the target object is acquired by the depth image sensor 140. Then, as shown in the upper right side of FIG. 5, the area of a gripping target object 80 in the depth image data is separated from the area of an obstacle 90, which is other than the gripping target object 80, thereby generating the depth image data from which the area of the gripping target object 80 is excluded.

At this time, since the spatial area from which the gripping target object 80 is excluded is not supplemented in the depth image, a part 90a in the obstacle 90 on the upper right side of FIG. 5 is recognized to be a "hole" by the interference determination unit 203. That is, even when there is a trajectory where the gripping target object 80 passes the position of the part 90a in the plan of the motion trajectory that has been generated by the operation planning unit 204, it is determined in the interference determination unit 203 that there is no interference.

Therefore, when the gripping arm 150 is operated in accordance with the plan of the motion trajectory from the state in which the gripping target object 80 is gripped by the gripping arm 150 shown in the lower left side of FIG. 5, the gripping target object 80 may interfere with the part 90a in the obstacle 90 as shown in the lower right side of FIG. 5.

Figure 6:
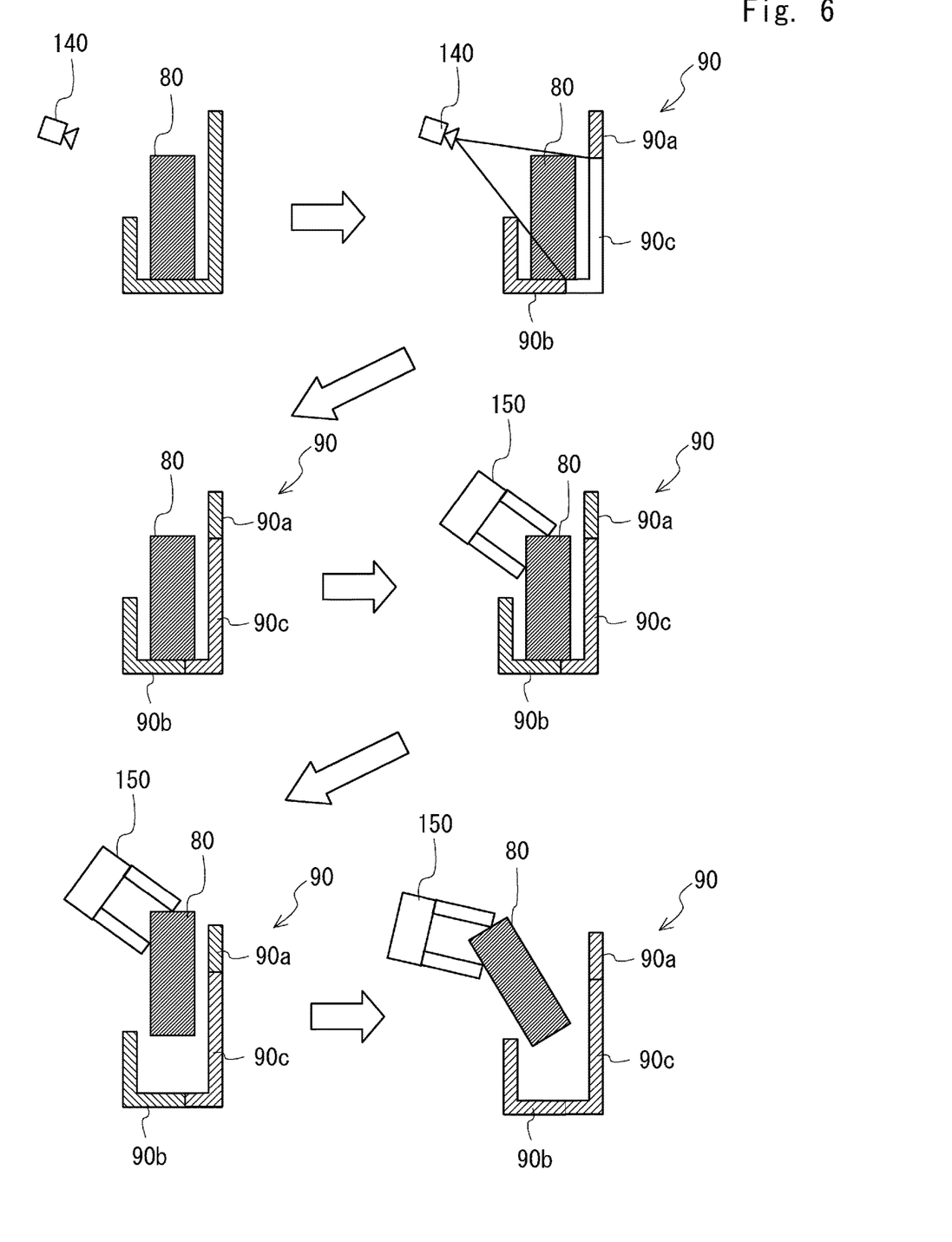
FIG. 6 is a schematic view for explaining a method of generating a trajectory through which the gripping arm is operated in the moving robot as the motion trajectory generation apparatus according to this embodiment.

FIG. 6 is a schematic view for explaining a method of generating the trajectory through which the gripping arm 150 is operated in the moving robot 100 as the motion trajectory generation apparatus according to this embodiment. As shown in the upper left side of FIG. 6, first, the depth image sensor 140 acquires the depth image in the vicinity of the gripping target object. Then, as shown in the upper right side of FIG. 6, the area of the gripping target object 80 in the depth image data is separated from the area of the obstacle 90, which is other than the gripping target object 80, thereby generating the depth image data from which the area of the gripping target object 80 is excluded.

After the area of the gripping target object 80 is excluded in the depth image, as shown in the middle left side of FIG. 6, the spatial area from which the gripping target object 80 is excluded is supplemented by the deficiency supplement unit 202. Therefore, the part 90a in the obstacle 90 is recognized to be an "obstacle" in the interference determination unit 203. That is, when there is a trajectory where the gripping target object 80 passes the position of the part 90a in the plan of the motion trajectory that has been generated by the operation planning unit 204, it is determined in the interference determination unit 203 that interference has occurred.

Accordingly, when the gripping arm 150 is operated in accordance with the plan of the motion trajectory from the state in which the gripping target object 80 is gripped by the gripping arm 150 shown in the middle left side of FIG. 6, neither the gripping arm 150 nor the gripping target object 80 interferes with the part 90a in the obstacle 90 as shown in the lower left side and the lower right side of FIG. 6.

From the aforementioned discussion, according to the moving robot 100 as the motion trajectory generation apparatus according to this embodiment, when the gripping arm is operated in accordance with the generated motion trajectory, it is possible to further reduce the probability that each of the gripping arm and the gripping target object may interfere with the obstacle in the vicinity of the gripping target object.

Modified Example 1

Modified Example 1 of the operation processing for generating the trajectory through which the gripping arm 150 is operated will be explained.

When it is impossible to specify the obstacle that is extended in the direction having some angle with respect to the horizontal direction from the second point cloudpoint cloud data after the first point cloudpoint cloud data is excluded in the depth image, this means that there is no obstacle that may interfere with the gripping arm 150. In this case, there is no need to perform processing for supplementing the estimated third point cloudpoint cloud data in the spatial area from which the first point cloudpoint cloud data is excluded. As described above, the first point cloudpoint cloud data is point cloudpoint cloud data that corresponds to the gripping target object and the second point cloudpoint cloud data is point cloudpoint cloud data in the vicinity of the target object.

Figure 7:
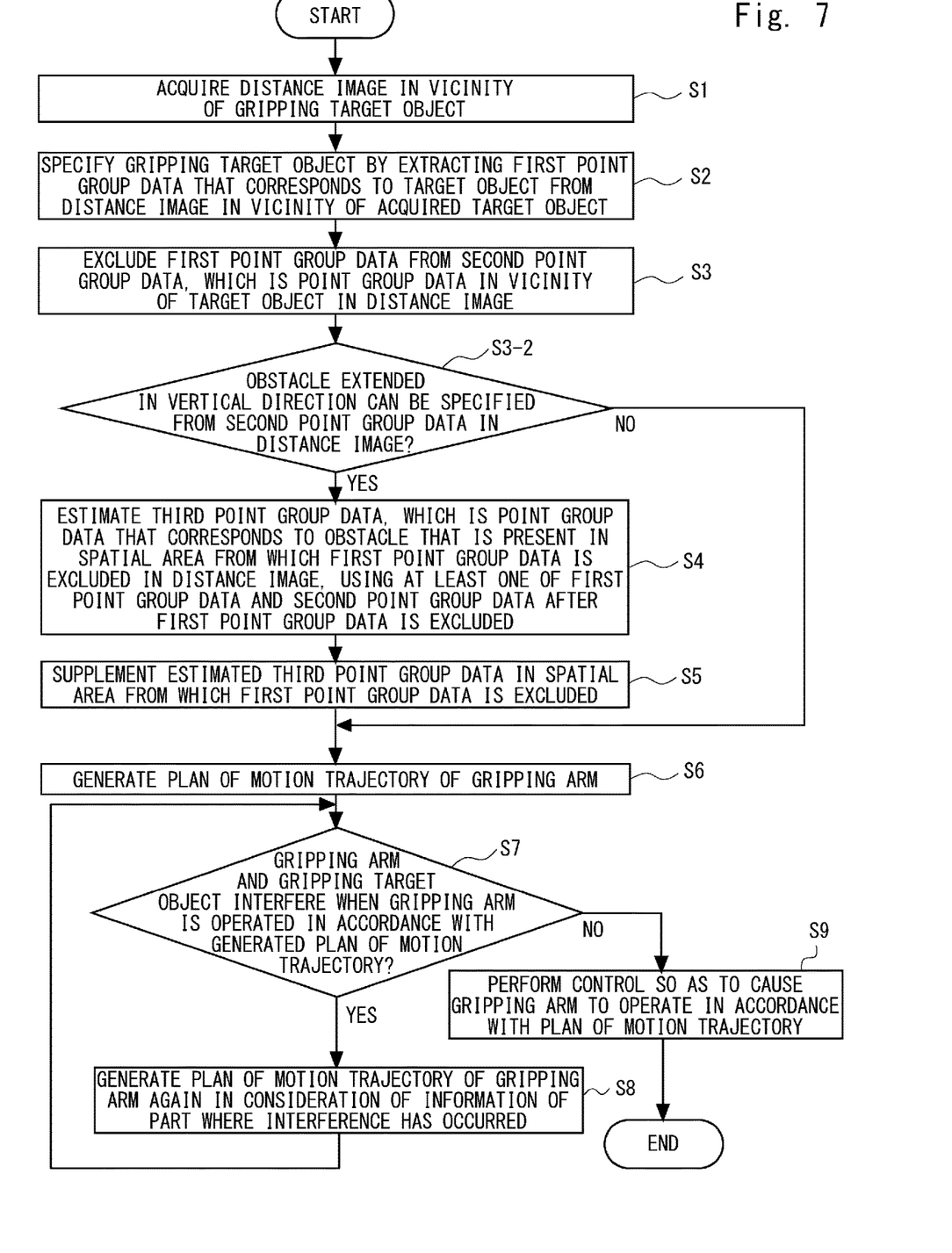
FIG. 7 is a flowchart showing a flow of operation processing for generating a trajectory through which a gripping arm is operated according to Modified Example 1.

FIG. 7 is a flowchart showing a flow of operation processing for generating the trajectory through which the gripping arm 150 is operated according to Modified Example 1. As shown in FIG. 7, in the operation processing according to Modified Example 1, processing for determining whether it is required to perform processing for supplementing the estimated third point cloudpoint cloud data in the spatial area from which the first point cloudpoint cloud data is excluded is added to the flowchart shown in FIG. 3. That is, Step S3-2 for determining whether it is required to perform the above processing is added between Step S3 and Step S4.

In Step S3-2, the gripping target separation unit 201 in the operation processor 200 determines whether it is possible to specify the obstacle that is extended in the direction having some angle with respect to the horizontal direction from the second point cloudpoint cloud data in the depth image. When it is determined in Step S3-2 that it is possible to specify the obstacle that is extended in the direction having some angle with respect to the horizontal direction (YES), the process goes to Step S4. When it is determined in Step S3-2 that it is impossible to specify the obstacle that is extended in the direction having some angle with respect to the horizontal direction (NO), the process goes to Step S6 without performing the processing of Steps S4-S5.

According to the above processing, it is possible to eliminate the calculation time required for unnecessary processing, whereby it is possible to perform operation processing for generating the trajectory through which the gripping arm 150 is operated more smoothly.

Incidentally, each of artifacts arranged in a factory or a house is often formed of a plane in the horizontal direction and a plane in the vertical direction. Therefore, when it is known in advance that there is only an artifact formed of the plane in the horizontal direction and the plane in the vertical direction as the obstacle that is present in the vicinity of the gripping target object, the processing in Step S3-2 of FIG. 7 can be made simpler. That is, in Step S3-2 of FIG. 7, the gripping target separation unit 201 in the operation processor 200 determines whether it is possible to specify the obstacle that is extended in the vertical direction from the second point cloudpoint cloud data in the depth image. It is assumed that the gripping target separation unit 201 recognizes that an angle close to the vertical direction (e.g., ±5° with respect to the vertical direction) is the vertical direction. According to this processing, the processing in the gripping target separation unit 201 becomes much simpler and the calculation time therein can be reduced compared to the case in which the gripping target separation unit 201 determines whether the obstacle that is extended in the direction having some angle with respect to the horizontal direction can be specified from the second point cloudpoint cloud data in the depth image.

Modified Example 2

Modified Example 2 of the method of estimating the third point cloudpoint cloud data, which is point cloudpoint cloud data that corresponds to the obstacle that is present in the spatial area from which the first point cloudpoint cloud data that corresponds to the gripping target object is excluded, will be explained. When the shape of the gripping target object is known, the third point cloudpoint cloud data, which is point cloudpoint cloud data that corresponds to the obstacle that is present in the spatial area from which the first point cloudpoint cloud data that corresponds to the gripping target object is excluded, can be estimated by the method according to Modified Example 2, which is different from the one described with reference to FIG. 4.

Figure 8:
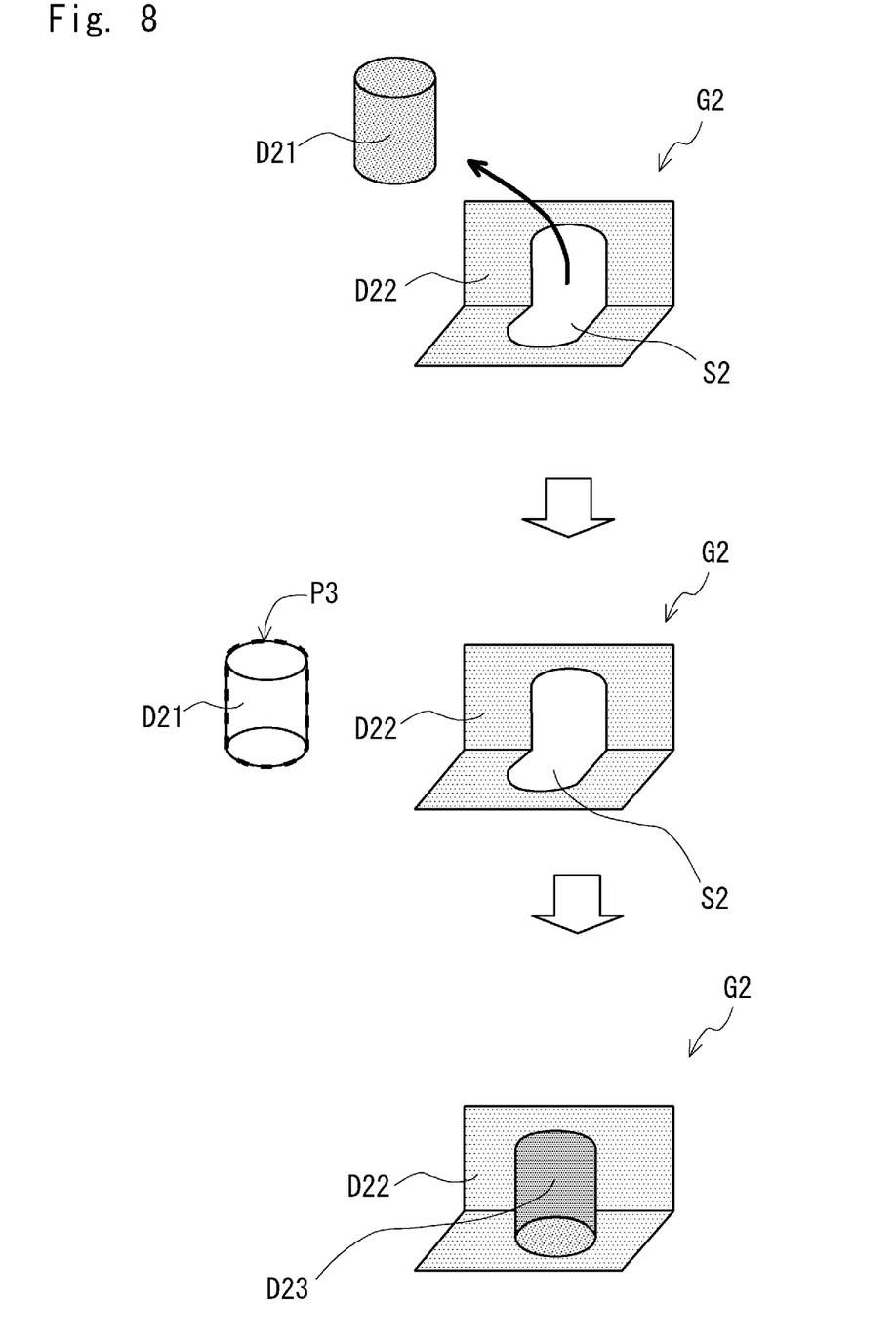
FIG. 8 is a schematic view for explaining a method of estimating third point cloudpoint cloud data, which is point cloudpoint cloud data that corresponds to an obstacle that is present in a spatial area from which first point cloudpoint cloud data that corresponds to a gripping target object is excluded according to Modified Example 2.

FIG. 8 is a schematic view for explaining the method of estimating third point cloudpoint cloud data D23, which is point cloudpoint cloud data that corresponds to the obstacle that is present in a spatial area S2 from which first point cloudpoint cloud data D21 that corresponds to the gripping target object is excluded according to Modified Example 2. Second point cloudpoint cloud data D22 is point cloudpoint cloud data obtained after the first point cloudpoint cloud data D21 is excluded from the second point cloudpoint cloud data, which is the point cloudpoint cloud data in the vicinity of the target object.

First, as shown in the upper stage of FIG. 8, the gripping target separation unit 201 (see FIG. 2) excludes the first point cloudpoint cloud data D21 from the second point cloudpoint cloud data in the vicinity of the gripping target object in a depth image G2. Next, as shown in the middle stage of FIG. 8, the deficiency supplement unit 202 (see FIG. 2) extracts a plane P3 that is present in a part, which is a blind area for the depth image sensor 140 (see FIG. 1), in the first point cloudpoint cloud data D21 that corresponds to the gripping target object. The point cloudpoint cloud that corresponds to this extracted plane P3 is estimated to be the third point cloudpoint cloud data D23, which is the point cloudpoint cloud data that corresponds to the obstacle that is present in the spatial area S2 from which the first point cloudpoint cloud data D21 has been excluded. Then the deficiency supplement unit 202 (see FIG. 2) supplements the estimated third point cloudpoint cloud data D23 in the spatial area S2 from which the first point cloudpoint cloud data is excluded shown in the middle stage of FIG. 8, as shown in the lower stage of FIG. 8. According to the above processing, it is possible to supplement the obstacle that is present in the spatial area from which the first point cloudpoint cloud data is excluded without performing complicated calculations.

Modified Example 3

Modified Example 3 of the method of estimating the third point cloudpoint cloud data, which is point cloudpoint cloud data that corresponds to the obstacle that is present in the spatial area from which the first point cloudpoint cloud data that corresponds to the gripping target object is excluded, will be explained. When the shape of the gripping target object is known, the third point cloudpoint cloud data, which is point cloudpoint cloud data that corresponds to the obstacle that is present in the spatial area from which the first point cloudpoint cloud data that corresponds to the gripping target object is excluded, can be estimated by the method according to Modified Example 3, which is different from the one described in Modified Example 2.

Figure 9:
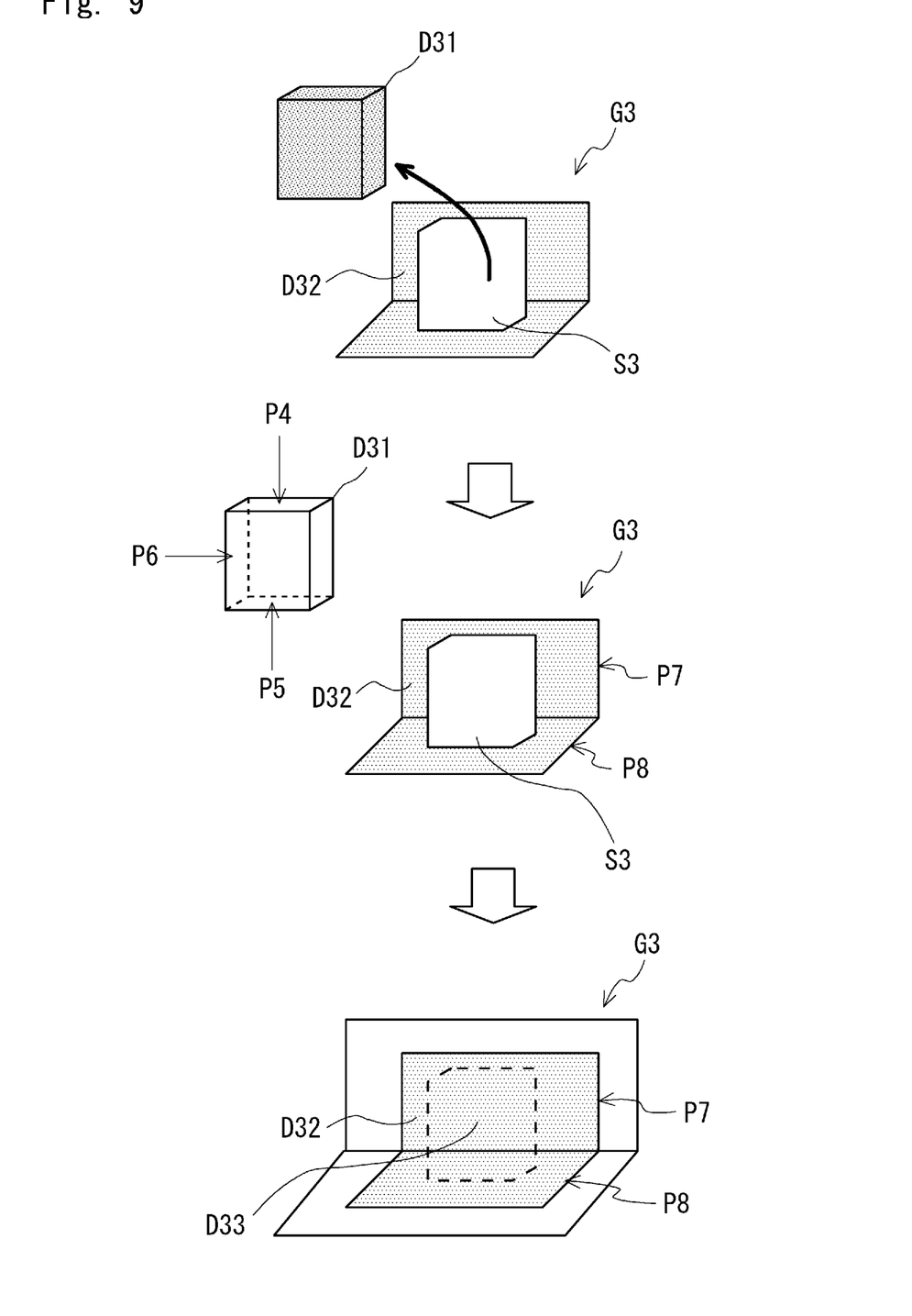
FIG. 9 is a schematic view for explaining a method of estimating third point cloudpoint cloud data, which is point cloudpoint cloud data that corresponds to an obstacle that is present in a spatial area from which first point cloudpoint cloud data that corresponds to a gripping target object is excluded according to Modified Example 3.

FIG. 9 is a schematic view for explaining a method of estimating third point cloudpoint cloud data D33, which is point cloudpoint cloud data that corresponds to the obstacle that is present in a spatial area S3 from which first point cloudpoint cloud data D31 that corresponds to the gripping target object has been excluded according to Modified Example 3. Second point cloudpoint cloud data D32 is point cloudpoint cloud data after the first point cloudpoint cloud data D31 is excluded from the second point cloudpoint cloud data, which is the point cloudpoint cloud data in the vicinity of the target object.

First, as shown in the upper stage of FIG. 9, the gripping target separation unit 201 (see FIG. 2) excludes the first point cloudpoint cloud data D31 from the second point cloudpoint cloud data in the vicinity of the gripping target object in a depth image G3. Next, as shown in the middle stage of FIG. 9, the deficiency supplement unit 202 (see FIG. 2) extracts planes P4, P5, and P6, which are a blind area for the depth image sensor 140 (see FIG. 1), from the first point cloudpoint cloud data D31. Then, the deficiency supplement unit 202 extracts planes P7 and P8 that are parallel to the planes P4, P5, and P6 of the gripping target object from the second point cloudpoint cloud data D32 from which the first point cloudpoint cloud data D31 has been excluded. In the second point cloudpoint cloud data D32 from which the first point cloudpoint cloud data D31 has been excluded, the plane parallel to the plane P4 of the gripping target object is the plane P7, the plane parallel to the plane P5 of the gripping target object is the plane P8, and there is no plane that is parallel to the plane P6 of the gripping target object.

Next, the deficiency supplement unit 202 (see FIG. 2) extends the planes P7 and P8 that are present in the vicinity of the target object to the spatial area S3 from which the first point cloudpoint cloud data D31 has been excluded, and estimates the point cloudpoint cloud data that corresponds to the part in the spatial area S3 among the planes P7 and P8 that have been extended to be the third point cloudpoint cloud data D33. Then, as shown in the lower stage of FIG. 9, the deficiency supplement unit 202 supplements the estimated third point cloudpoint cloud data D33 in the spatial area S3 from which the first point cloudpoint cloud data is excluded. According to the above processing, it is possible to supplement the obstacle that is present in the spatial area from which the first point cloudpoint cloud data D31 has been excluded without performing complicated calculations.

The present disclosure is not limited to the aforementioned embodiment and may be changed as appropriate without departing from the spirit of the present disclosure. While the configuration in which the motion trajectory generation apparatus is the moving robot 100 has been described in the aforementioned embodiment, this is merely an example. The motion trajectory generation apparatus may have another structure as long as it includes at least the gripping arm 150, the depth image sensor 140, and the operation processor 200 included in the control unit 190.

While the present disclosure has been described as a hardware configuration in the aforementioned embodiment, the present disclosure is not limited thereto. The present disclosure can achieve each processing by causing a CPU to execute a computer program.

In the aforementioned example, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM, CD-R, CD-R/W, and semiconductor memories (such as mask ROM, Programmable ROM (PROM), Erasable PROM (EPROM), flash ROM, RAM, etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A motion trajectory generation apparatus of a gripping arm, the motion trajectory generation apparatus comprising:
a gripping arm configured to grip a target object;
a depth image sensor configured to acquire a depth image including point cloudpoint cloud data, which is coordinate data of a plurality of points on a surface of a subject; and
an operation processor configured to perform operation processing for generating a plan of a motion trajectory of the gripping arm, wherein
the operation processor specifies the target object by extracting first point cloudpoint cloud data of the target object from the point cloudpoint cloud data of the depth image acquired by the depth image sensor,
the operation processor excludes the first point cloudpoint cloud data from second point cloudpoint cloud data, which is point cloudpoint cloud data in the vicinity of the target object, in the depth image,
the operation processor estimates, using at least one of the first point cloudpoint cloud data and the second point cloudpoint cloud data after the first point cloudpoint cloud data has been excluded, third point cloudpoint cloud data, which is point cloudpoint cloud data that corresponds to an obstacle that is present in a spatial area from which the first point cloudpoint cloud data is excluded in the depth image, and supplements the third point cloudpoint cloud data in the spatial area from which the first point cloudpoint cloud data is excluded, and
the operation processor generates the plan of the motion trajectory in such a way that neither the gripping arm nor the target object interferes with the second point cloudpoint cloud data after the first point cloudpoint cloud data has been excluded and the third point cloudpoint cloud data.

2. The motion trajectory generation apparatus according to claim 1, wherein the operation processor specifies planes that are present in the vicinity of the target object from the second point cloudpoint cloud data after the first point cloudpoint cloud data has been excluded, extends the planes that are present in the vicinity of the target object to the spatial area from which the first point cloudpoint cloud data is excluded, and estimates point cloudpoint cloud data that corresponds to a part in the spatial area from which the first point cloudpoint cloud data is excluded among the planes that have been extended to be the third point cloudpoint cloud data.

3. The motion trajectory generation apparatus according to claim 1, wherein the operation processor determines whether it is possible to specify an obstacle that is extended in a direction having some angle with respect to a horizontal direction from the second point cloudpoint cloud data in the depth image, and when it is impossible to specify the obstacle that is extended in the direction having the angle, the operation processor excludes the first point cloudpoint cloud data from the second point cloudpoint cloud data in the depth image and does not perform processing for supplementing the estimated third point cloudpoint cloud data in the spatial area from which the first point cloudpoint cloud data is excluded.

4. A motion trajectory generation method in which a plan of a motion trajectory of a gripping arm for gripping a target object is generated using a depth image sensor configured to acquire a depth image including point cloudpoint cloud data, which is coordinate data of a plurality of points on a surface of a subject, the method comprising the steps of:
specifying first point cloudpoint cloud data of the target object from point cloudpoint cloud data of the depth image acquired by the depth image sensor;
excluding the first point cloudpoint cloud data from second point cloudpoint cloud data, which is point cloudpoint cloud data in the vicinity of the target object, in the depth image;
estimating, using at least one of the first point cloudpoint cloud data and the second point cloudpoint cloud data after the first point cloudpoint cloud data has been excluded, third point cloudpoint cloud data, which is point cloudpoint cloud data that corresponds to an obstacle that is present in a spatial area from which the first point cloudpoint cloud data is excluded in the depth image, and supplementing the estimated third point cloudpoint cloud data in the spatial area from which the first point cloudpoint cloud data is excluded; and
generating the plan of the motion trajectory in such a way that neither the gripping arm nor the target object interferes with the second point cloudpoint cloud data and the third point cloudpoint cloud data.

5. A program for causing a computer to execute a processing procedure for generating a plan of a motion trajectory of a gripping arm for gripping a target object using a depth image sensor configured to acquire a depth image including point cloudpoint cloud data, which is coordinate data of a plurality of points on a surface of a subject, the processing procedure comprising:
specifying first point cloudpoint cloud data of the target object from the point cloudpoint cloud data of the depth image acquired by the depth image sensor;
excluding the first point cloudpoint cloud data from second point cloudpoint cloud data, which is point cloudpoint cloud data in the vicinity of the target object, in the depth image;
estimating, using at least one of the first point cloudpoint cloud data and the second point cloudpoint cloud data after the first point cloudpoint cloud data has been excluded, third point cloudpoint cloud data, which is point cloudpoint cloud data that corresponds to an obstacle that is present in a spatial area from which the first point cloudpoint cloud data is excluded in the depth image, and supplementing the estimated third point cloudpoint cloud data in the spatial area from which the first point cloudpoint cloud data is excluded; and
generating the plan of the motion trajectory in such a way that neither the gripping arm nor the target object interferes with the second point cloudpoint cloud data and the third point cloudpoint cloud data.

* * * * *